(12) United States Patent
Safar

(10) Patent No.: US 10,941,754 B2
(45) Date of Patent: Mar. 9, 2021

(54) FLUID DRIVEN MOTOR DEVICE

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 26 days.

(21) Appl. No.: 16/662,338

(22) Filed: Oct. 24, 2019

(65) Prior Publication Data
US 2020/0056597 A1    Feb. 20, 2020

Related U.S. Application Data

(63) Continuation-in-part of application No. 15/844,620, filed on Dec. 18, 2017, now abandoned.

(51) Int. Cl.
*F03G 7/06*    (2006.01)
*F03B 17/00*    (2006.01)

(52) U.S. Cl.
CPC ........... *F03G 7/06* (2013.01); *F03B 17/00* (2013.01)

(58) Field of Classification Search
CPC ..... F03G 7/00; F03G 7/06; F03G 7/10; F03G 3/00; F03G 3/02; F03B 1/02; F03B 17/00; F03B 17/005; F03B 17/02; F03B 17/025; F03B 17/04; Y02E 10/20; F02B 51/00; F02B 51/02; F03H 3/00; F03H 99/00

See application file for complete search history.

(56) References Cited

U.S. PATENT DOCUMENTS

| | | | | | |
|---|---|---|---|---|---|
| 3,495,406 | A | * | 2/1970 | Donatelli | F02B 51/00 60/227 |
| 3,798,896 | A | * | 3/1974 | Yang | F03G 7/06 60/527 |

FOREIGN PATENT DOCUMENTS

FR    2352964 A1 * 12/1977    ............ F03G 7/00

* cited by examiner

*Primary Examiner* — Mark A Laurenzi
*Assistant Examiner* — Xiaoting Hu
(74) *Attorney, Agent, or Firm* — Samir Hanna Safar

(57) ABSTRACT

A fluid driven motor device is provided, which does not use a magnet or an armature coil, includes a motor casing chamber containing a fluid mixture, a shaft disposed within the chamber, and a plurality of ray guns arranged on the periphery of the chamber, and a unidirectional gear assembly. The shaft has a plurality of cell holders, onto which a corresponding plurality of membrane cells is attached. Each membrane cell holds a predetermined quantity of a liquid. The membrane cells expand continuously based on the firing of the subatomic rays by the plurality of ray guns causing the shaft to rotate. The device has several advantages such as being very energy and heat efficient, having lesser weight as compared to conventional electromagnetic coil based motors.

6 Claims, 8 Drawing Sheets

FLUID DRIVEN MOTOR DEVICE

CROSS-REFERENCE TO RELATED APPLICATIONS

The present application is a continuation-in-part of currently pending U.S. patent application Ser. No. 15/844,620, filed on Dec. 18, 2017, which is hereby incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

FIELD OF THE INVENTION

The present invention belongs to the field of fluid driven motors and more particularly relates to a novel fluid driven motor device which is energy and heat efficient, and does not use a magnet or an armature coil.

BACKGROUND OF THE INVENTION

Development of energy efficient motors is of interest considering a variety of applications. An energy efficient motor minimizes heat losses. Fluid driven motors have several advantages such as being very energy and heat efficient, having lesser weight as compared to conventional electromagnetic coil based motors. Fluid driven motors as disclosed by present invention can have numerous applications such as in space flights where magnetic interference matter and weight matters. Also these motors are easy to assemble as compared to conventional motors since they do not involve armature coils, magnetic materials or conducting material plates. Also they do not overheat as copper coil based motors.

Below are given some of the known prior art indicating the importance of this area.

U.S. Pat. No. 7,614,861 entitled "Rotary fluid-driven motor with sealing elements" describes a static-fluid-pressure-driven rotary motor includes a casing, which defines a chamber having a fluid inlet and a fluid outlet, and at least one rotor assembly rotatably mounted within the casing. The rotor assembly includes a rotor, a plurality of barrier elements associated with, and extending outwards from, the rotor, and a resilient seal associated with at least an outer edge of each of the barrier elements. As the rotor turns about its axis of rotation, the outer edges of the barrier elements passing in proximity to a facing wall of the casing chamber against which the resilient seals for a sliding seal while accommodating variations in clearance between the outer edge of the barrier element and the facing wall of the casing.

U.S. Pat. No. 3,740,960 entitled "Elastic pressure fluid driven motor" describes an elastic pressure fluid driven motor consisting of a cylinder housing and a piston reciprocably guided in said housing. The piston is hollow and encloses a chamber which is fed with elastic pressure fluid from an elastic pressure fluid source. The piston and the housing are provided with openings and the housing is provided with distributing channels for distributing pressure fluid from the chamber into the cylinder during the return stroke and power stroke of the piston and vent it to the atmosphere, while the piston is reciprocated in the housing.

In currently pending U.S. patent application Ser. No. 15/844,620, filed on Dec. 18, 2017, the present inventor disclosed a fluid driven motor device that overcame the limitations of prior art. The invention disclosed presently in this application provides an improvement in controlling the motion and performance of the fluid driven motor device.

Despite various improvements and progress in the field, some of the major obstacles that still exist, such as ease and simplicity in manufacturing and operation. In addition, it would be a significant improvement in art if a fluid driven motor is developed that is light in weight, energy efficient, does not involve armature coils or magnets and hence does not exhibit electromagnetic interference of any type.

Accordingly, improvements are needed in the existing methods and structures that negate the above shortcomings in the existing systems.

SUMMARY OF THE INVENTION

The purpose and methodology of all the above inventions that are part of prior art do not envisage the unique embodiment of an improved fluid driven motor, which does not use any magnetic material or an armature coil, is energy efficient, light in weight and does not involve any electromagnetic components as in a traditional electric motor.

The present invention discloses an improved fluid driven motor comprising:

(a) a motor casing chamber containing a fluid mixture, comprising: a first coolant liquid, and an inert gas in predetermined proportions,
    wherein the motor casing chamber is provided with one or more means for entry of the inert gas and one or more means for entry of the first coolant liquid,
    and the first coolant liquid being characterized by a low viscosity;

(b) a shaft disposed centrally and rotatably within the motor casing chamber,
    wherein the shaft includes a plurality of cell holders,
    said plurality of cell holders being coupled to a corresponding plurality of membrane cells,
    wherein each membrane cell comprises a transparent, flexible membrane and a pointed sharp solid member, said flexible membrane and said pointed sharp solid member conjoined to enclose a cavity containing a second liquid of predetermined quantity and configured to expand at a predetermined frequency, (c) a plurality of ray guns provided on peripheral positions of the chamber,
    wherein the plurality of ray guns are capable of emitting sub atomic rays of pre-determined characteristics directed towards the plurality of membrane cells synchronously.

(d) a unidirectional gear assembly provided on an external side of the motor casing chamber, comprising: a ratchet gear wheel with slots, a spring loaded pawl mounted around a fixed rod and configured to engage with the slots of the ratchet gear wheel;

(e) a removable cover enclosing the unidirectional gear assembly, (f) a casing cover lid that closes the motor casing chamber, and the removable cover enclosing the unidirectional gear assembly;

(g) a power source coupled to the plurality of ray guns, (h) a ray gun timing controller configured as a microcontroller based logic controller and electronically coupled to the plurality of ray guns to control the frequency and duration of firing, wherein the plurality of ray guns are pre-programmed to emit sub atomic rays at the same pre-determined frequency towards the plurality of membrane cells, causing a unidirectional rotational motion of the shaft owing to expansion of the second liquid contained within the cavities of the membrane cells at regular intervals such that each membrane cell is fired at by a plurality of ray guns in consecutive rapid succession.

The scope of the invention is to be determined by the terminology of the following description, claims, drawings and the legal equivalents thereof. The present invention may be summarized, at least in part, with reference to its objectives.

It is therefore a primary objective of the present invention to provide an energy efficient motor device with minimum heat losses.

Another objective of the present invention is to provide a fluid driven motor device that is very light in weight as compared to a coiled motor.

Another objective of the present invention is to provide a fluid driven motor device that is easy to assemble and does not involve any electrically conducting wires or any electrically conducting plates.

A further objective of the present invention is to provide a fluid driven motor device that does not use an armature coil or conducting plates and hence does not over heat as conventional copper coils.

Yet another objective of the present invention is to provide a fluid driven motor device that does not involve any magnetic material and does not generate electromagnetic interference that affects other electronic devices in the vicinity.

The above summary is intended to illustrate exemplary embodiments of the invention, which will be best understood in conjunction with the detailed description to follow, and are not intended to limit the scope of the invention.

Additional objects and embodiments of the invention will be set forth in part in the description which follows, and in part will become apparent to those skilled in the art upon examination of the following, or may be learned by practice of the invention. Thus these and other objects of the present invention will be more readily apparent when considered in reference to the following description and when taken in conjunction with the accompanying drawings.

Figure 1:
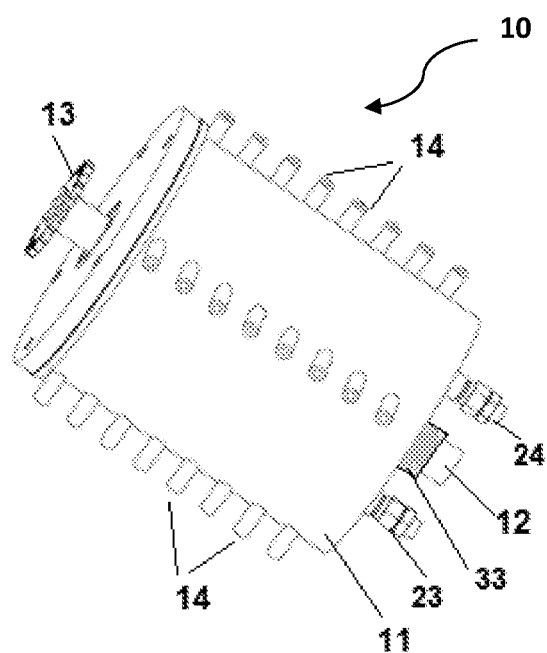
FIG. 1 is an illustrative diagram depicting the fluid driven motor device according to the present invention.

LIST OF REFERENCE NUMBERING 10 labels a fluid driven motor device.
11 labels a motor casing chamber containing a fluid mixture
12 labels a shaft disposed centrally within the chamber 11
13 labels a gear
14 labels a plurality of ray guns
15 labels a membrane cell
16 labels a cell holder
17 labels a cotter pin
18 labels a roller bearing
19 labels a shaft stopper
20 labels a casing cover lid
21 labels a transparent, flexible membrane
22 labels a pointed sharp solid member
23 labels a gas injection valve
24 labels a liquid injection valve
25 labels a sealing gasket
26 labels a bearing
27 labels a power source
30 labels a unidirectional gear assembly
31 labels a fixed rod of the unidirectional gear assembly
32 labels a spring loaded pawl
33 labels a ratchet gear wheel with slots
G denotes an inert gas
$L_1$ denotes a first coolant liquid
$L_2$ denotes a second liquid

DETAILED DESCRIPTION OF THE INVENTION

As required, detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

The following description is presented to enable any person skilled in the art to make and use the invention, and is provided in the context of particular applications of the invention and their requirements.

The invention described herein provides an improved and novel fluid driven motor device, comprising:
(a) a motor casing chamber containing a fluid mixture, comprising: a first coolant liquid, and an inert gas in predetermined proportions,
   wherein the motor casing chamber is provided with one or more means for entry of the inert gas and one or more means for entry of the first coolant liquid,
   and the first coolant liquid being characterized by a low viscosity;
(b) a shaft disposed centrally and rotatably within the motor casing chamber,
   wherein the shaft includes a plurality of cell holders,
   said plurality of cell holders being coupled to a corresponding plurality of membrane cells,
   wherein each membrane cell comprises a transparent, flexible membrane and a pointed sharp solid member, said flexible membrane and said pointed sharp solid member conjoined to enclose a cavity containing a second liquid of predetermined quantity and configured to expand at a predetermined frequency,
(c) a plurality of ray guns provided on peripheral positions of the chamber,
   wherein the plurality of ray guns are capable of emitting sub atomic rays of pre-determined characteristics directed towards the plurality of membrane cells synchronously.
(d) a unidirectional gear assembly provided on an external side of the motor casing chamber, comprising: a ratchet gear wheel with slots, a spring loaded pawl mounted around a fixed rod and configured to engage with the slots of the ratchet gear wheel;
(e) a removable cover enclosing the unidirectional gear assembly,
(f) a casing cover lid that closes the motor casing chamber, and the removable cover enclosing the unidirectional gear assembly;
(g) a power source coupled to the plurality of ray guns,
(h) a ray gun timing controller configured as a microcontroller based logic controller and electronically coupled to the plurality of ray guns to control the frequency and duration of firing,
wherein the plurality of ray guns are pre-programmed to emit sub atomic rays at the same pre-determined frequency towards the plurality of membrane cells, causing a unidirectional rotational motion of the shaft owing to expansion of the second liquid contained within the cavities of the membrane cells at regular intervals such that each membrane cell is fired at by a plurality of ray guns in consecutive rapid succession. The present invention is described with reference to accompanying FIG. 1, which depicts an external perspective view of an embodiment of the improved fluid driven motor device 10. 11 denotes a motor casing chamber containing a fluid mixture. The fluid mixture comprises of an inert gas G and a first coolant liquid $L_1$. Preferably, $L_1$ is characterized by a low viscosity. In a preferred embodiment of the invention, the inert gas G and the first coolant liquid $L_1$ are present in the ratio of 1:100 by volume. The inert gas and the first coolant liquid are filled initially in the motor casing chamber 11, during the time of manufacture. 12 denotes a shaft disposed centrally and rotatably within the motor casing chamber 11. The shaft 12 is coupled to a gear 13 at one end. A plurality of ray guns 14 are provided on the periphery of the motor casing chamber 11. A gas injection valve 23 and a liquid injection valve 24 are provided on the chamber 11. A ratchet gear wheel with slots, 33 is provided to facilitate unidirectional motion of the shaft 12.

Figure 2:
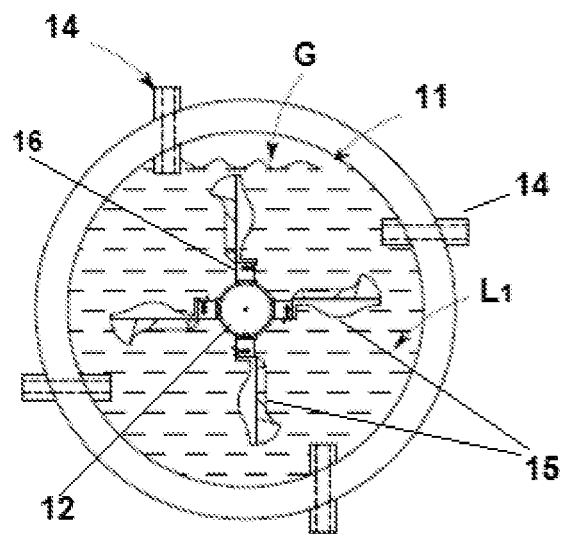
FIG. 2 is an illustrative diagram depicting a top sectional view of the chamber of the improved fluid driven motor device, containing the fluid.

As depicted in FIG. 2, a top sectional view of the motor casing chamber 11 containing the fluid mixture of the inert gas G and the first coolant liquid $L_1$ is depicted. Preferably, $L_1$ has a low viscosity. A membrane cells 15 coupled to the shaft 12, via a cell holder 16 are shown. A plurality of membrane cells are provided, each membrane cell coupled to the shaft via a cell holder. The low viscosity of $L_1$ ensures minimum frictional losses during the motion of the plurality of membrane cells 15 in the fluid mixture. The plurality of rays guns 14 are arranged on the peripheral positions of the motor casing chamber 11.

Figure 3:
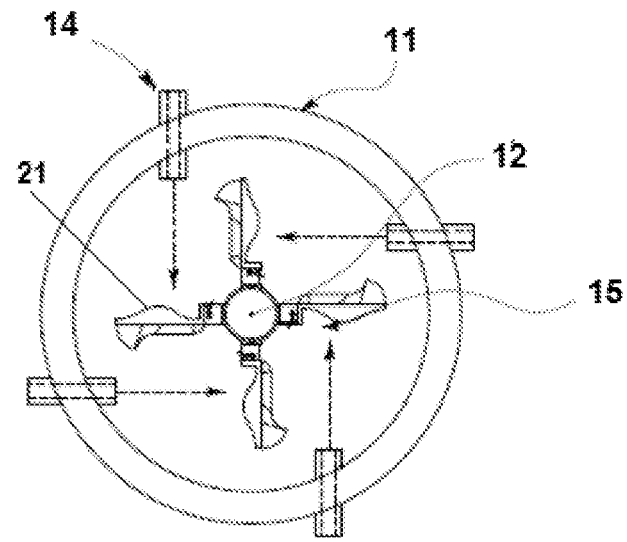
FIG. 3 is an illustrative diagram depicting a top sectional view of the chamber of the improved fluid driven motor device, without the fluid.

FIG. 3 depicts a top sectional view of the motor casing chamber 11 of the improved fluid driven motor device 10. In this figure, the fluid is not shown. A plurality of membrane cells 15 coupled to the shaft 12 are shown. The plurality of rays guns 14 are arranged on the peripheral positions of the motor casing chamber 11. The plurality of ray guns 14 are directed to point towards the transparent, flexible membrane 21 of the membrane cell.

Figure 4:
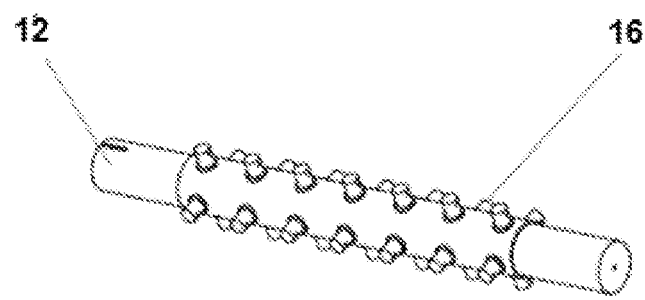
FIG. 4 is an illustrative diagram depicting a shaft of the improved fluid driven motor device.

FIG. 4 represents a view of the shaft 12 of the improved fluid driven motor device. A plurality of cell holders 16 are provided on the shaft 12. The cell holders are provided to secure the plurality of membranes (not shown in FIG. 4) on to the shaft 12.

Figure 5:
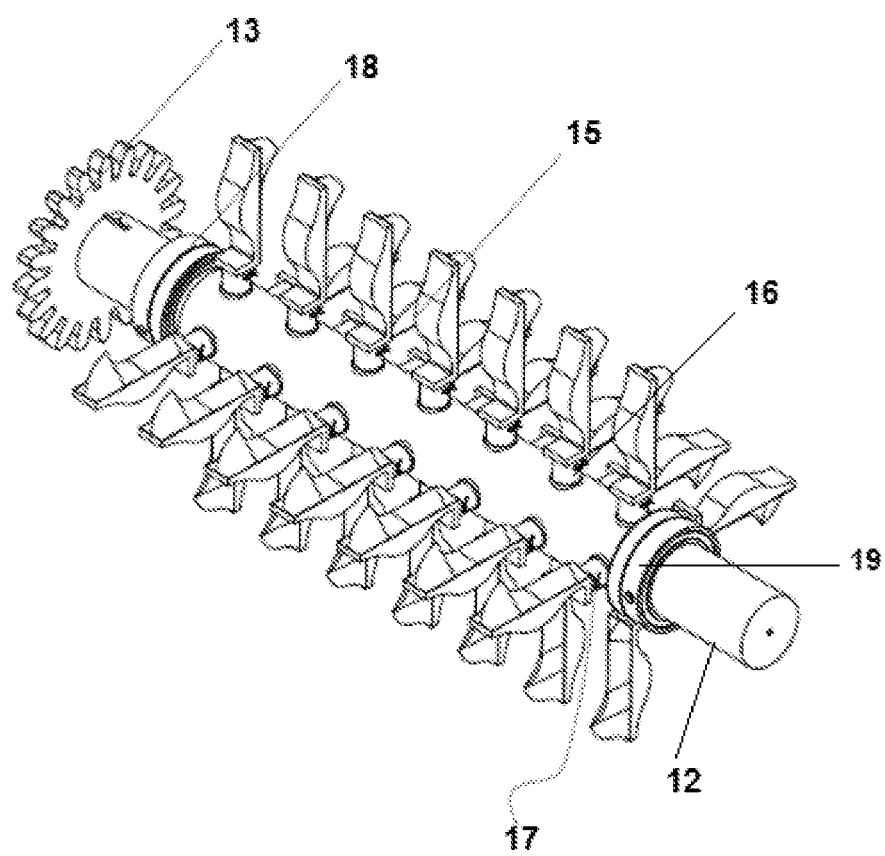
FIG. 5 is an illustrative diagram depicting a shaft of the improved fluid driven motor device along with the plurality of membrane cell holders.

FIG. 5 represents a detailed view of the shaft 12 of the fluid driven motor device. The shaft 12 is coupled to a gear 13 at one end. A plurality of membrane cells 15 are coupled to a plurality of cell holders 16 respectively. 17 depicts fastening means such as a cotter pin. 18 denotes a roller bearing, which is provided to reduce the rotational friction and support the shaft 12. 19 denotes a shaft stopper.

Figures 6A, 6B, 6C:
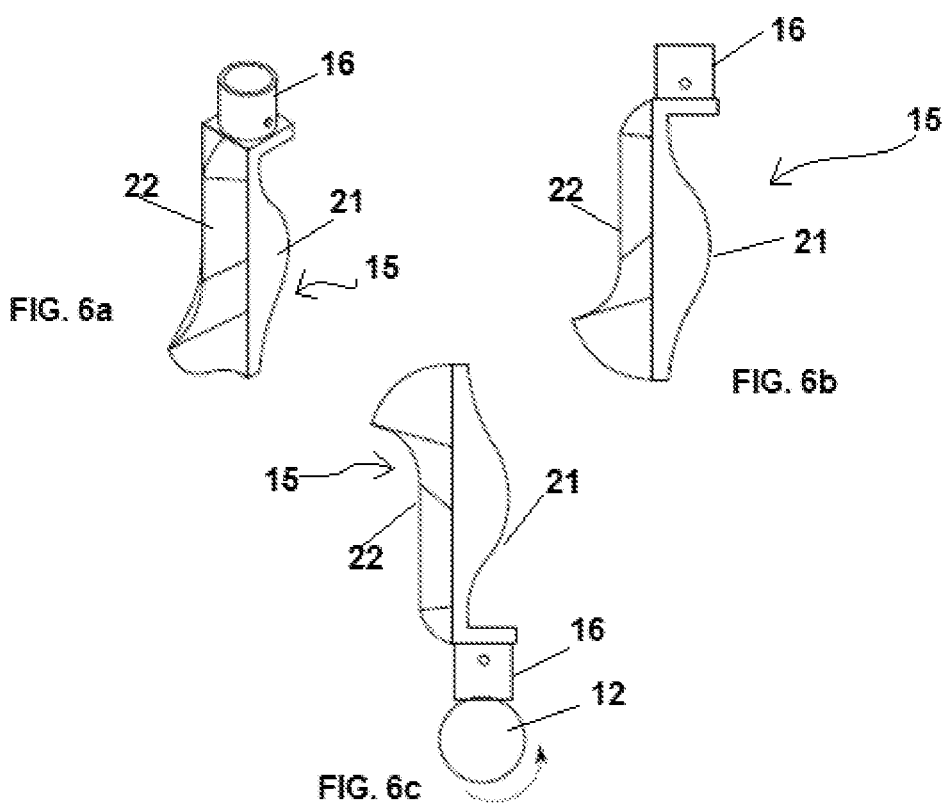
FIG. 6a depicts a membrane cell coupled to a cell holder.
FIG. 6b depicts an alternate view of a membrane cell coupled to a cell holder.
FIG. 6c depicts a membrane cell coupled to a cell holder attached to the shaft.

FIG. 6a depicts a membrane cell 15 coupled to a cell holder 16 respectively. 21 depicts a transparent, flexible membrane. 22 depicts a pointed sharp solid member. 22 is shaped as a knife with a sharp edge, and typically has a polished surface. This shape is preferred to minimize the frictional losses. 21 and 22 are coupled to each other such that they form a cavity. The cavity is suitably provided to contain a second liquid $L_2$ (not shown in this figure).

FIG. 6b depicts an alternate view of a membrane cell 15 coupled to a cell holder 16 respectively. 21 depicts a transparent, flexible membrane. 22 depicts a pointed sharp solid member. 21 and 22 are coupled to each other such that they form a cavity. The cavity is suitably provided to contain a second liquid $L_2$ (not shown in this figure).

FIG. 6c depicts a membrane cell 15 coupled to a cell holder 16 attached to the shaft 12. 21 depicts a transparent, flexible membrane. 22 depicts a pointed sharp solid member. 21 and 22 are coupled to each other such that they form a cavity. The cavity is suitably provided to contain a second liquid $L_2$ (not shown in this figure).

Figures 7A, 7B:
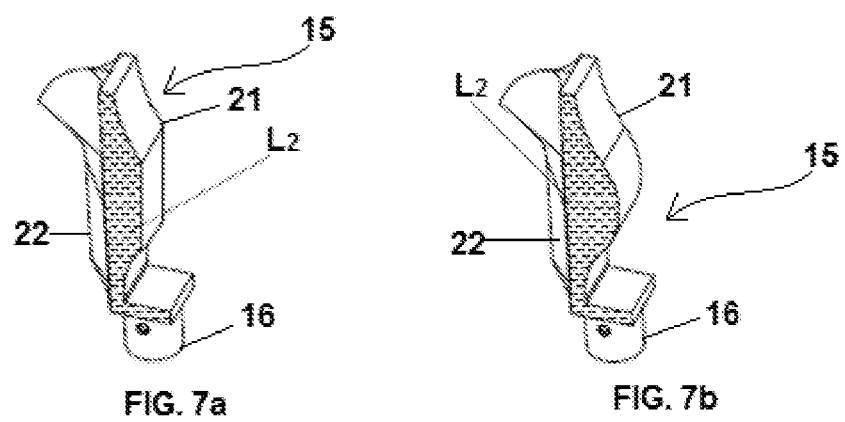
FIG. 7a depicts a membrane cell containing a second liquid during a contraction cycle.
FIG. 7b depicts a membrane cell containing a second liquid during an expansion cycle.

FIG. 7a depicts a membrane cell 15 containing a second liquid $L_2$ during a contraction cycle. The membrane cell 15 is coupled to the cell holder 16. 21 depicts a transparent, flexible membrane. 22 depicts a pointed sharp solid member. 21 and 22 are coupled to each other such that they form a cavity. The cavity is suitably provided to contain a second liquid $L_2$.

FIG. 7b depicts a membrane cell containing a second liquid $L_2$ during an expansion cycle. The membrane cell 15 is coupled to the cell holder 16. 21 depicts a transparent, flexible membrane. 22 depicts a pointed sharp solid member.

21 and 22 are coupled to each other such that they form a cavity. The cavity is suitably provided to contain a second liquid $L_2$.

Figure 8:
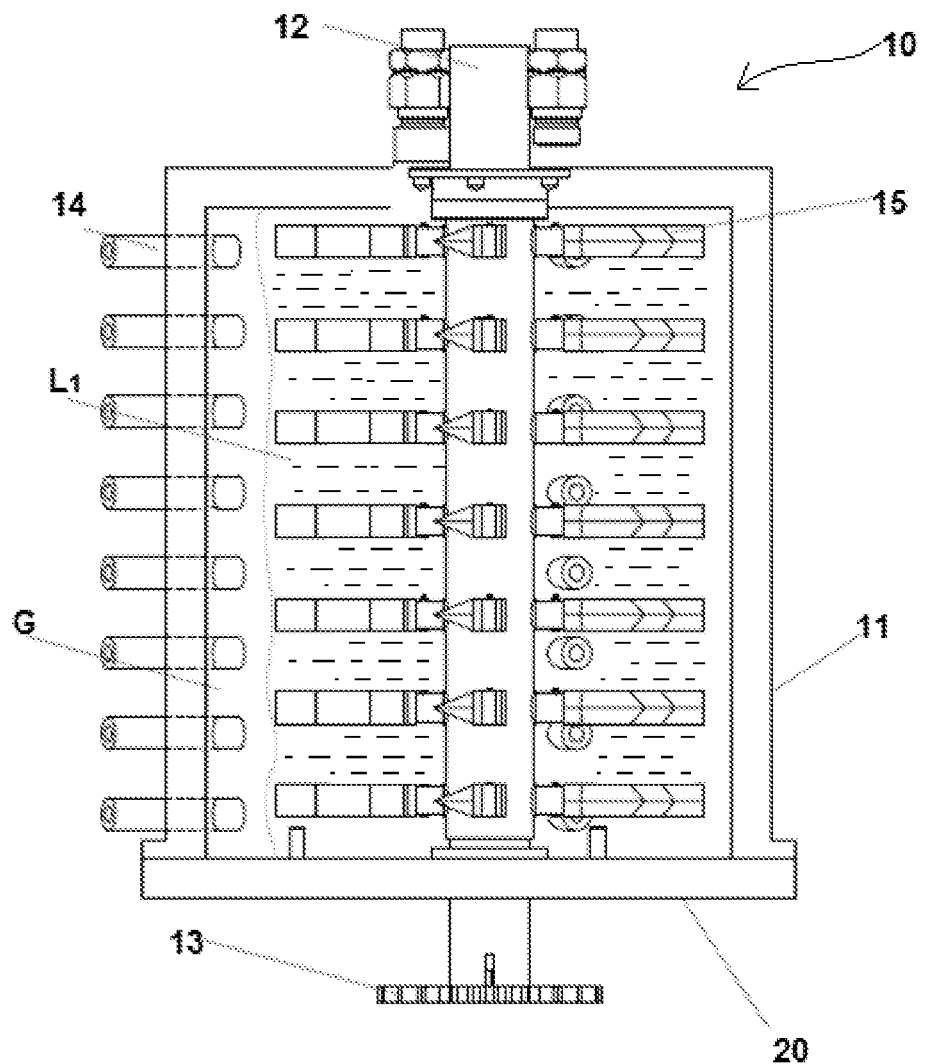
FIG. 8 is an illustrative diagram depicting a sectional view of the chamber of the improved fluid driven motor device in an embodiment of the present invention.

FIG. 8 represents a sectional view of the chamber of the improved fluid driven motor device 10 in an embodiment of the present invention. 10 comprises of a motor casing chamber 11 containing a fluid mixture of inert gas G a first coolant liquid $L_1$, wherein $L_1$ has a low viscosity. The low viscosity of $L_1$ ensures minimum frictional losses and reduces the resistance and drag, during the motion of the plurality of membrane cells 15 in the fluid mixture. 12 denotes a shaft disposed centrally and rotatably within the motor casing chamber 11. The shaft 12 is coupled to a gear 13 at one end. A plurality of ray guns 14 are provided on the periphery of the motor casing chamber 11. 20 denotes a casing cover lid provided to close the motor casing chamber 11 at one end. The unidirectional gear assembly 30 is not shown in the figure.

Figure 9:
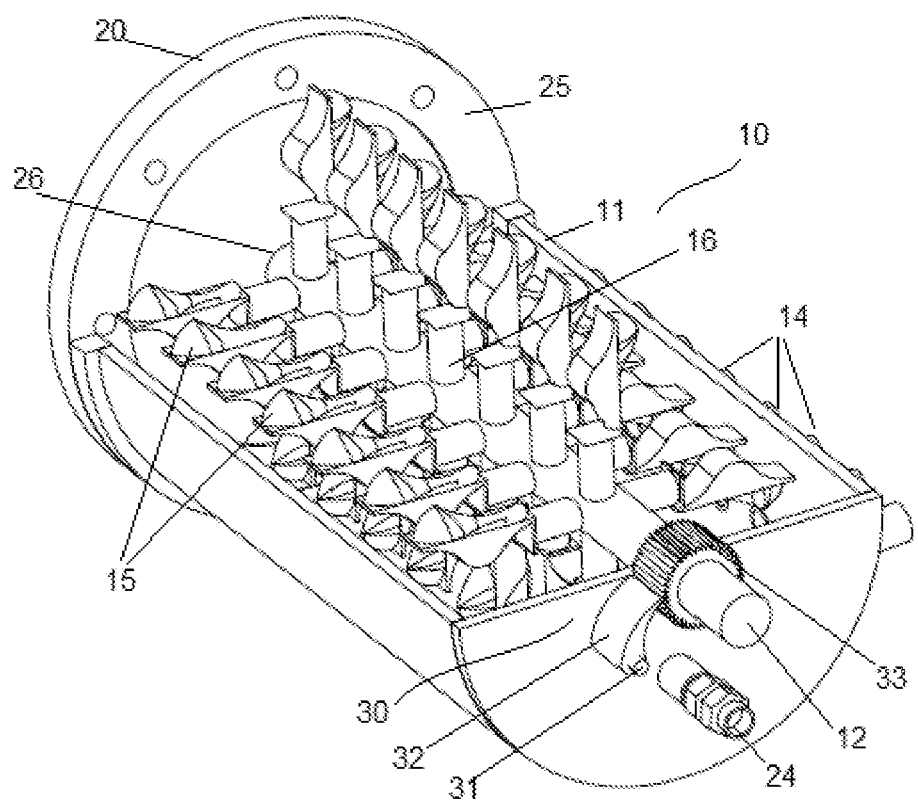
FIG. 9 is an illustrative diagram depicting a perspective view of the improved fluid driven motor device.

FIG. 9 represents a partial sectional perspective view of the improved fluid driven motor device 10. The motor casing chamber 11 is closed at one end by a casing cover lid 20. A plurality of ray guns 14 are provided on the periphery of the motor casing chamber 11. A plurality of membrane cells 15 are coupled to a plurality of cell holders 16. The plurality of cell holders 16 are attached to the shaft 12. 19 denotes a shaft stopper. 24 denotes a liquid injection valve. 25 denotes a sealing gasket. 26 denotes a bearing. 30 denotes a unidirectional gear assembly provided to ensure unidirectional motion of the shaft 12. The unidirectional gear assembly 30 comprises of a fixed rod 31, a spring loaded pawl 32 (the spring component is not shown in the figure) and a ratchet gear wheel with slots, 33. The unidirectional gear assembly is preferably enclosed within a removable cover (not shown in FIG. 9). The spring loaded pawl 32 is mounted around the fixed rod 31 and is configured to engage with the slots of the ratchet gear wheel 33, such that only unidirectional motion of the shaft 12 can take place. Preferably, the components of the unidirectional gear assembly 30 are made of a material which very light and is heat resistant.

In an exemplary embodiment of the invention, only one gas injection valve 23 (not shown in FIG. 9) and only one liquid injection valve 24 has been provided. However more than one such valve may be provided as a means for entry of an inert gas and a first coolant liquid in the motor casing chamber. The inert gas and the first coolant liquid are injected initially in predetermined proportions at the time of manufacturing and assembly.

Figure 10:
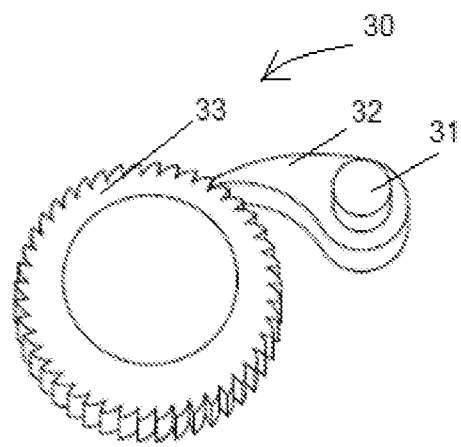
FIG. 10 is an illustrative diagram depicting a perspective view of the unidirectional gear assembly.

FIG. 10 represents the unidirectional gear assembly 30 in detail. The unidirectional gear assembly 30 comprises of a fixed rod 31, a spring loaded pawl 32 (the spring component is not shown in the figure) and a ratchet gear wheel with slots, 33. The unidirectional gear assembly is preferably enclosed within a removable cover (not shown in the figure). The spring loaded pawl 32 is mounted around the fixed rod 31 and is configured to engage with the slots of the ratchet gear wheel 33, such that only unidirectional motion of the shaft 12 can take place.

Figure 11:
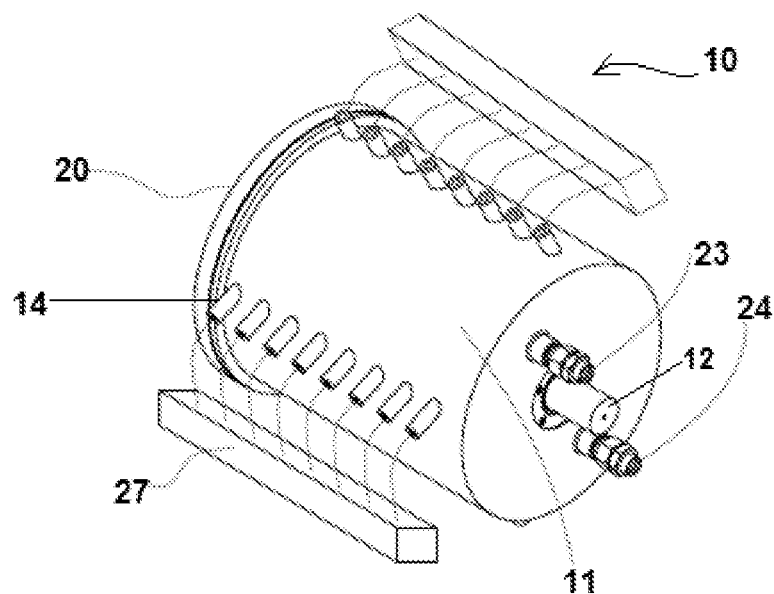
FIG. 11 is an illustrative diagram depicting a partial perspective view of the improved fluid driven motor device, in an embodiment of the present invention.

FIG. 11 represents an alternate view of the improved fluid driven motor device 10. The motor casing chamber 11 is provided with a casing cover lid 20. 23 denotes a gas injection valve. 24 denotes a liquid injection valve. The plurality of ray guns 14 are coupled to a power source 27. The plurality of ray guns 14 are also electronically coupled a microcontroller based logic controller (not shown in the figure) to control the frequency and duration of firing. As the ray guns fire sub-atomic rays such as laser beams directed towards the transparent, flexible membrane surface of the membrane cells, the second liquid $L_2$, contained in the membrane cells immediately vapourizes and expands. The vapourization process happens extremely quickly, and leads to instantaneous expansion of the membrane cell. The expansion of the membrane cell causes it to move forward. As the vapour cools down owing to heat transfer to the coolant liquid $L_1$, contained in the motor casing chamber, the membrane cell begins to contracts, but just as the contraction starts, in quick rapid succession, the membrane cell faces the laser beams from the next ray gun, and undergoes almost instantaneous expansion once again. The expansion of the membrane cell happens repeatedly, one after another in succession. Each time, just as the contraction begins, the expansion cycle recurs as the membrane cell is fired at by the next ray gun. The unidirectional gear assembly 30, not shown in the figure, is provided to ensure unidirectional movement of the shaft 12.

The simultaneous forward movement of the membrane cells results in rotational movement of the shaft. This rotational movement of the shaft is harnessed with the help of gear device. The low viscosity of $L_1$ ensures minimum frictional losses and reduces the resistance and drag, during the motion of the plurality of membrane cells in the fluid mixture. The rotational speed of the shaft is governed by the timing and firing of the ray guns and can be pre-programmed.

Figure 12:
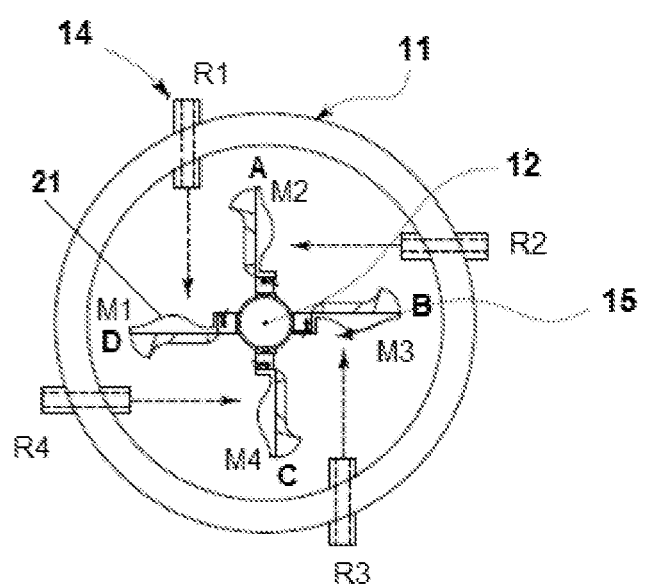
FIG. 12 is a top sectional view of the chamber of the improved fluid driven motor device, without the fluid, depicting positions of membrane cells.

The movement of the membrane cells to drive the shaft is better understood by way of the following exemplary description with reference to FIG. 12 wherein 11 represents the motor casing chamber, 12 represents the shaft, 15 represents membrane cells and 21 represents a transparent flexible membrane. By way of example, four membrane cells M1, M2, M3 and M4 are considered, along with four ray guns R1, R2, R3 and R4 positioned on a peripeheral edge of the chamber. t1, t2, t3 and t4 are four time instants when the membrane cells are fired at by ray guns at four different positions. At instant t1, M1, M2, M3 and M4 are at positions D, A, B, and C respectively and are fired at by ray guns R1, R2, R3 and R4 respectively. The expansion of the membrane cells cause forward movement and at instant t2, M1, M2, M3 and M4 are at positions C, D, A and B respectively and are fired at by ray guns R4, R1, R2 and R3 respectively. After the membrane cells expand, at instant t3, M1, M2, M3 and M4 are at positions B, C, D and A respectively and are fired at by ray guns R3, R4, R1 and R2 respectively. As the expansion of the membrane cells cause forward movement and at instant t4, M1, M2, M3 and M4 are at positions A, B, C and D respectively and are fired at by ray guns R2, R3, R4 and R1 respectively. This cyclical process continues to drive the forward movement of the shaft 12.

As a fail-safe measure, the unidirectional gear assembly ensures unidirectional motion of the central shaft. Preferably, the components of the unidirectional gear assembly are made of very light, heat resistant material.

In alternate embodiments of the invention, the plurality of ray guns fire synchronously with respect to each other and consecutively with respect to a single membrane cell. In alternate embodiments of the invention, each single ray gun is directed at a specific position that is occupied by a single membrane cell cyclically. In alternate embodiments of the invention, the ratio of the volumes of the inert gas to the coolant liquid contained in the motor casing chamber is 1:100. In alternate embodiments of the invention, the plurality of ray guns emit sub atomic rays such as laser beams of predetermined characteristics.

In alternate embodiments of the invention, the pointed sharp solid member of the membrane cell has a polished surface and is provided with a sharp edge so as to minimize frictional resistance. In a preferred embodiment, the liquid $L_2$ contained in the membrane cell 15, is an energy absorbing liquid.

In an alternate embodiment of the invention, the plurality of ray guns are positioned in the periphery of the motor casing chamber in a symmetrical pattern. The ray guns may be directed in as many directions to correspond to the number of directions of the membrane cells. In an alternate embodiments, the ray guns may be positioned vertically, one below another to form a straight line on the periphery of the motor casing chamber. Alternately, these may be arranged spirally, diagonally or any geometric pattern, symmetric or asymmetric. The pattern of the ray guns is designed to suit the firing of the laser beams to the flexible membrane of the membrane cells.

In an alternate embodiment of the invention, the ray guns are positioned in the periphery of the motor casing chamber in an asymmetrical pattern. In another embodiment, the liquid contained in the membrane cell has the capacity to quickly absorb and dissipate the heat.

The pointed sharp solid member 22 of the membrane cell may be made of a material such as titanium. Preferably, the pointed sharp solid member 22 has a polished surface and is provided with a sharp edge so as to minimize frictional resistance.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed. In this application, the terminology 'embodiment' can be used to describe any aspect, feature, process or step, any combination thereof, and/or any portion thereof, etc.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

I claim:

1. A fluid driven motor device, comprising:
   a) a motor casing chamber containing a fluid mixture, comprising: a first coolant liquid, and an inert gas in predetermined proportions,
      wherein the motor casing chamber is provided with one or more means for entry of the inert gas and one or more means for entry of the first coolant liquid, and the first coolant liquid being characterized by a low viscosity;
   b) a shaft disposed centrally and rotatably within the motor casing chamber,
      wherein the shaft includes a plurality of cell holders, said plurality of cell holders being coupled to a corresponding plurality of membrane cells,
      wherein each membrane cell comprises a transparent, flexible membrane and a pointed sharp solid member, said flexible membrane and said pointed sharp solid member conjoined to enclose a cavity containing a second liquid of predetermined quantity and configured to expand at a predetermined frequency;
   c) a plurality of ray guns provided on peripheral positions of the chamber, wherein the plurality of ray guns are capable of emitting sub atomic rays of pre-determined characteristics directed towards the plurality of membrane cells synchronously;
   d) a unidirectional gear assembly provided on an external side of the motor casing chamber, comprising: a ratchet gear wheel with slots, a spring loaded pawl mounted around a fixed rod and configured to engage with the slots of the ratchet gear wheel;
   e) a removable cover enclosing the unidirectional gear assembly;
   f) a casing cover lid that closes the motor casing chamber, and the removable cover enclosing the unidirectional gear assembly;
   g) a power source coupled to the plurality of ray guns,
   h) a ray gun timing controller configured as a microcontroller based logic controller and electronically coupled to the plurality of ray guns to control the frequency and duration of firing,
   wherein the plurality of ray guns are pre-programmed to emit sub atomic rays at the same pre-determined frequency towards the plurality of membrane cells, causing a unidirectional rotational motion of the shaft owing to expansion of the second liquid contained within the cavities of the membrane cells at regular intervals such that each membrane cell is fired at by a plurality of ray guns in consecutive rapid succession.

2. The fluid driven motor as claimed in claim 1, wherein the plurality of ray guns fire synchronously with respect to each other and consecutively with respect to a single membrane cell.

3. The fluid driven motor device as claimed in any of the claim 1 or 2, wherein each single ray gun is directed at a specific position that is occupied by a single membrane cell cyclically.

4. The fluid driven motor device as claimed in claim 3, wherein the ratio of the volumes of the inert gas to the coolant liquid contained in the motor casing chamber is 1:100.

5. The fluid driven motor device as claimed in claim 4, wherein the plurality of ray guns emit laser beams of predetermined characteristics.

6. The fluid driven motor device as claimed in claim 5, wherein the pointed sharp solid member of the membrane cell has a polished surface and is provided with a sharp edge so as to minimize frictional resistance.

* * * * *